(12) United States Patent
Kitajima et al.

(10) Patent No.: US 6,807,942 B2
(45) Date of Patent: Oct. 26, 2004

(54) CONTROL SYSTEM FOR INTERNAL COMBUSTION ENGINE

(75) Inventors: Shinichi Kitajima, Wako (JP); Hironao Fukuchi, Wako (JP); Atsushi Matsubara, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 48 days.

(21) Appl. No.: 10/315,084

(22) Filed: Dec. 10, 2002

(65) Prior Publication Data

US 2003/0106530 A1 Jun. 12, 2003

(30) Foreign Application Priority Data

Dec. 12, 2001 (JP) ........................................ 2001-378105

(51) Int. Cl.$^7$ ........................... F02D 41/04; F02M 25/07
(52) U.S. Cl. ............. 123/406.48; 123/478; 123/568.21; 701/104; 701/108
(58) Field of Search ................... 123/568.11, 568.21, 123/406.44, 406.48, 478; 701/104, 108

(56) References Cited

U.S. PATENT DOCUMENTS

| | | | | |
|---|---|---|---|---|
| 5,241,943 A | * | 9/1993 | Miyashita et al. | 123/679 |
| 5,524,591 A | * | 6/1996 | Hirota et al. | 123/478 |
| 6,283,089 B1 | * | 9/2001 | Fuwa et al. | 123/295 |
| 6,681,564 B2 | * | 1/2004 | Nishiyama et al. | 60/285 |
| 2002/0139361 A1 | * | 10/2002 | Itoyama et al. | 123/698 |
| 2003/0226544 A1 | * | 12/2003 | Nakamori et al. | 123/406.48 |

FOREIGN PATENT DOCUMENTS

| | | |
|---|---|---|
| JP | 59-192838 | 11/1984 |
| JP | 60-169641 | 9/1985 |
| JP | 7-119508 | 5/1995 |
| JP | 7-127494 | 5/1995 |

* cited by examiner

*Primary Examiner*—Hai Huynh
(74) *Attorney, Agent, or Firm*—Arent Fox, PLLC (57) ABSTRACT

A control system for an internal combustion engine is disclosed. The engine has an exhaust gas recirculation passage for recirculating a portion of exhaust gases from the engine to an intake system and an exhaust gas recirculation control valve for controlling an amount of exhaust gases recirculated through the exhaust gas recirculation passage. A valve opening amount of the exhaust gas recirculation control valve is detected. A fuel amount to be supplied to the engine is calculated according to the valve opening amount of the exhaust gas recirculation control valve. An average valve opening value, a change rate of which is smaller than that of the detected valve opening amount is used to calculate a correction value for correcting the fuel supply amount. The fuel supply amount is corrected according to the calculated correction value from a time at which an opening of the exhaust gas recirculation control valve is detected.

12 Claims, 9 Drawing Sheets

CONTROL SYSTEM FOR INTERNAL COMBUSTION ENGINE

BACKGROUND OF THE INVENTION

1. Field of the Invention

The present invention relates to a control system for an internal combustion engine, and more particularly to a control system for an internal combustion engine including an exhaust gas recirculation mechanism for recirculating a certain amount of exhaust gases to an intake system.

2. Description of the Related Art

An intake air amount of an internal combustion engine, provided with a exhaust gas recirculation mechanism, is reduced by an amount of exhaust gas recirculated to an intake system of the engine. Therefore, there is a known technique for correcting a fuel supply amount according to an exhaust gas recirculation amount. In general, an exhaust gas recirculation control valve for controlling an exhaust gas recirculation amount opens with a time lag (a dead time period) with respect to a valve opening command signal. Therefore, in order to prevent the correction of a fuel supply amount or an ignition timing during a time when exhaust gases are not actually recirculated, a method of delaying the start of the above correction has been disclosed, for example, in Japanese Patent Laid-open No. Sho 60-169641. In this method, the start of the correction is delayed according to the dead time period from the time the valve opening command signal is output to the time the exhaust gas recirculation control valve actually starts to open. Similarly, a method of gradually changing a correction value from the time the valve opening command signal of the exhaust gas recirculation control valve is outputted, has been disclosed in Japanese Patent Laid-open No. Sho 59-192838.

The methods disclosed in the above-described publications, however, do not set a correction value corresponding to an actual lift amount (valve opening amount) of the exhaust gas recirculation control valve. To solve such a problem, a method of detecting a lift amount of the exhaust gas recirculation control valve and calculating a correction value of a fuel supply amount according to the detected lift amount, has been disclosed in Japanese Patent Laid-open No. Hei 7-127494. Further, a method of detecting a lift amount of the exhaust gas recirculation control valve and calculating a correction value of an ignition timing according to the detected lift amount, has been disclosed in Japanese Patent Laid-open No. Hei 7-119508.

According to the method of delaying the correction start timing, disclosed in Japanese Patent Laid-open No. Sho 60-169641 or the method of gradually changing the correction value, disclosed in Japanese Patent Laid-open No. Sho 59-192838, the improvement effect of the correction may not be sufficiently obtained, since the correction is not performed according to an actual lift amount of the exhaust gas recirculation control valve.

The methods disclosed in Japanese Patent Laid-open Nos. Hei 7-127494 and Hei 7-119508 have the following problem.

Figure 10:
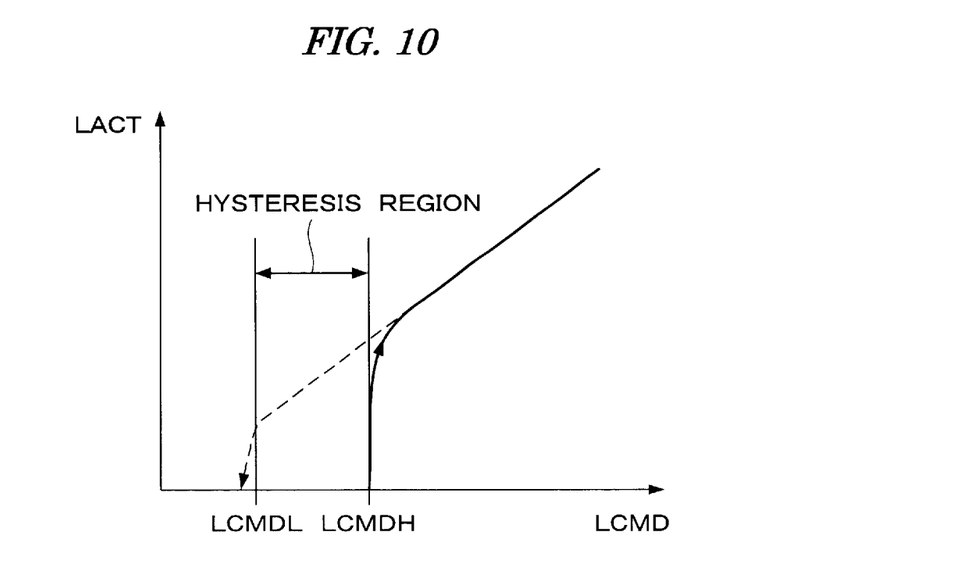
FIG. 10 is a graph for illustrating a problem of a conventional system.

An exhaust gas recirculation control valve generally has a hysteresis characteristic as shown in FIG. 10. As shown by a solid line in this figure, when increasing a valve opening command signal LCMD, an actual lift amount LACT starts to increase from a time at which the LCMD value reaches a valve opening start command value LCMDH, and when decreasing the valve opening command signal LCMD, the valve is closed after the LCMD value reaches a valve closing command value LCMDL. In this way, at the time of valve opening, the actual lift amount LACT rapidly increases from the valve closed state, and thereafter, the actual lift amount LACT changes to follow the valve opening command signal LCMD. Accordingly, if a correction value of the fuel amount or the ignition timing is changed according to such a rapid change in the actual lift amount LACT, an air-fuel ratio of an air-fuel mixture to be supplied to the engine or the ignition timing rapidly changes. As a result, the exhaust characteristic and/or driveability of the engine often temporarily deteriorates.

SUMMARY OF THE INVENTION

An object of the present invention is to provide a control system for an internal combustion engine, which prevents a fuel supply amount correction value or an ignition timing correction value from rapidly changing when an actual lift amount of the exhaust gas recirculation control valve rapidly changes, and thereby maintaining desirable exhaust characteristics and/or driveability.

To achieve the above object, the present invention provides a control system for an internal combustion engine having an exhaust gas recirculation passage for recirculating a portion of exhaust gases from the engine to an intake system, and an exhaust gas recirculation control valve for controlling an amount of exhaust gases recirculated through the exhaust gas recirculation passage. The control system includes valve opening amount detecting means and fuel supply amount correcting means. The valve opening amount detecting means detects a valve opening amount of the exhaust gas recirculation control valve. The fuel supply amount correcting means corrects a fuel amount to be supplied to the engine according to the valve opening amount of the exhaust gas recirculation control valve. The fuel supply amount correcting means includes average value calculating means and correction value calculating means. The average value calculating means calculates an average valve opening value according the valve opening amount detected by the valve opening amount detecting means. A change rate of the average valve opening value is smaller than that of the valve opening amount detected by the valve opening amount detecting means. The correction value calculating means calculates a correction value for correcting the fuel supply amount according to the average valve opening value. The fuel supply amount correcting means corrects the fuel supply amount according to the calculated correction value from a time at which an opening of the exhaust gas recirculation control valve is detected by the valve opening amount detecting means.

With this configuration, an average valve opening value, a change rate of which is smaller than that of a valve opening amount detected by the valve opening amount detecting means, is calculated, and a correction value for correcting a fuel supply amount is calculated according to the average valve opening value. The correction of the fuel supply amount according to the correction value is started from the time the opening of the exhaust gas recirculation control valve is detected by the valve opening amount detecting means. Accordingly, it is possible to prevent the correction value of the fuel supply amount from being rapidly changed when the actual valve opening amount of the exhaust gas recirculation control valve rapidly changes, and hence to keep a desirable exhaust characteristic.

The present invention further provides a control system for an internal combustion engine having an exhaust gas recirculation passage for recirculating a portion of exhaust gases from the engine to an intake system and an exhaust gas recirculation control valve for controlling an amount of exhaust gases recirculated through the exhaust gas recirculation passage. The control system includes valve opening amount detecting means and ignition timing correcting means. The valve opening amount detecting means detects a valve opening amount of the exhaust gas recirculation control valve. The ignition timing correcting means corrects an ignition timing of the engine according to the valve opening amount of the exhaust gas recirculation control valve. The ignition timing correcting means includes average value calculating means and correction value calculating means. The average value calculating means calculates an average valve opening value according the valve opening amount detected by the valve opening amount detecting means. A change rate of the average valve opening value is smaller than that of the valve opening amount detected by the valve opening amount detecting means. The correction value calculating means calculates a correction value for correcting the ignition timing according to the average valve opening value. The ignition timing correcting means corrects the ignition timing according to the calculated correction value from a time at which an opening of the exhaust gas recirculation control valve is detected by the valve opening amount detecting means.

With this configuration, an average valve opening value, a change rate of which is smaller than that of a valve opening amount detected by the valve opening amount detecting means, is calculated, and a correction value for correcting an ignition timing is calculated according to the average valve opening value. The correction of the ignition timing according to the correction value is started from the time the opening of the exhaust gas recirculation control valve is detected by the valve opening amount detecting means. Accordingly, it is possible to prevent the correction value of the ignition timing from being rapidly changed when the actual valve opening amount of the exhaust gas recirculation control valve rapidly changes, and hence to keep a desirable driveability.

Preferably, the average value calculating means sets the change rate of the average valve opening value such that the change rate of the average valve opening value becomes smaller as the average valve opening value becomes smaller.

With this configuration, the change rate of the average valve opening value is set to become smaller as the average valve opening value becomes smaller. Accordingly, immediately after the opening of the exhaust gas recirculation control valve is started, the change rate of the average valve opening value is small, and as the valve opening amount increases, the change rate of the average valve opening value is increased to rapidly follow a change in the actual valve opening amount. As a result, it is possible to control the fuel supply amount or the ignition timing in accordance with the valve opening characteristic (see FIG. 10) of the exhaust gas recirculation control valve.

Other objects and advantages of the present invention will be apparent from the following description in conjunction with the accompanying drawings.

DETAILED DESCRIPTION OF THE PREFERRED EMBODIMENTS

A preferred embodiment of the present invention will be hereinafter described with reference to the drawings.

Figure 1:
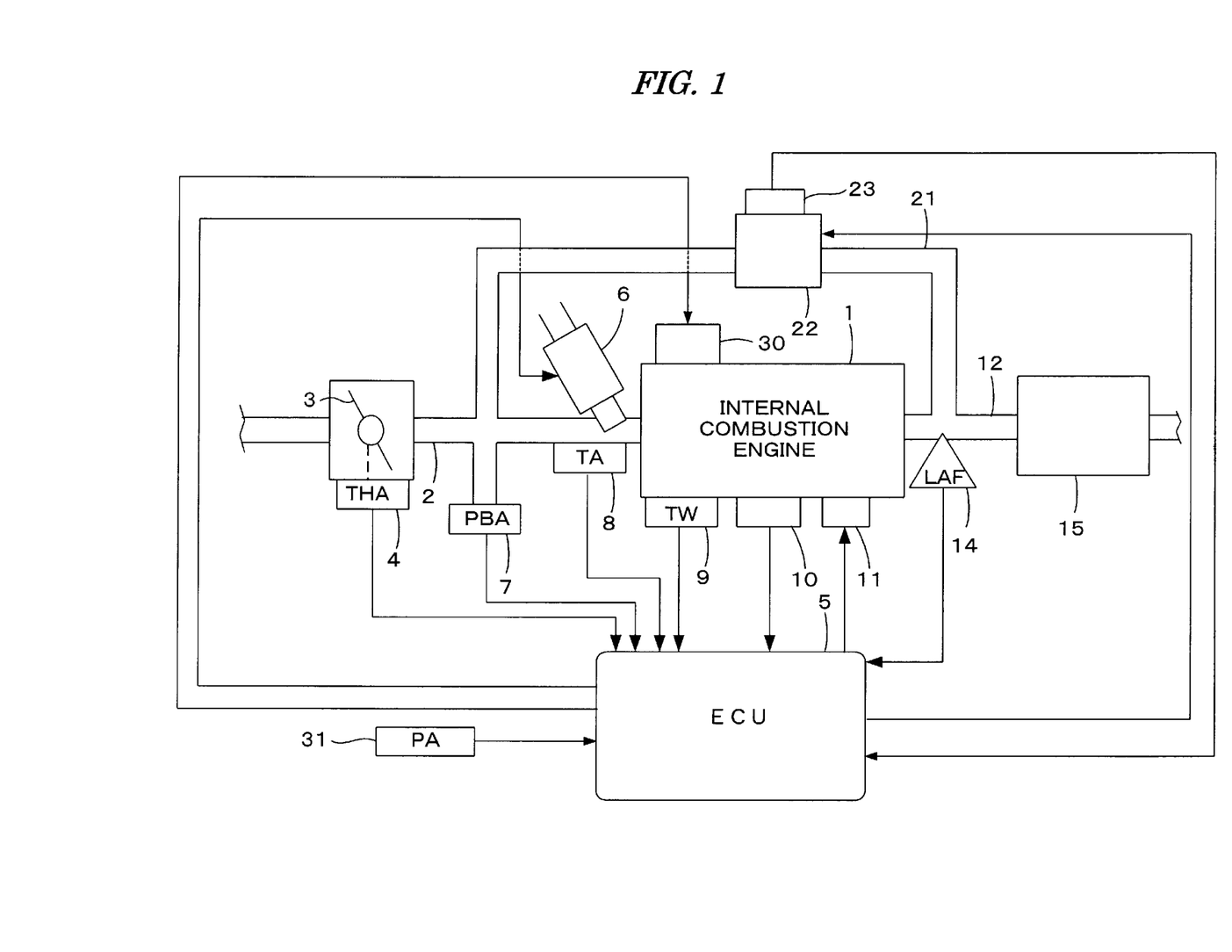
FIG. 1 shows a configuration of an internal combustion engine and a control system therefor according to an embodiment of the present invention.

Referring to FIG. 1, there is schematically shown a general configuration of an internal combustion engine (which will be hereinafter referred to as "engine") and a control system therefor according to a preferred embodiment of the present invention. The engine illustrated represents a four-cylinder engine 1, for example, and it has an intake pipe 2 provided with a throttle valve 3. A throttle opening (THA) sensor 4 is connected to the throttle valve 3, so as to output an electrical signal corresponding to an opening angle of the throttle valve 3 and supply the electrical signal to an electronic control unit (which will be hereinafter referred to as "ECU") 5.

Fuel injection valves 6, only one of which is shown, may be inserted into the intake pipe 2 at locations intermediate between the cylinder block of the engine 1 (i.e., slightly upstream of the respective intake valves (not shown)) and the throttle valve 3. The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor, a TDC sensor, and a CRK sensor. The cylinder discrimination sensor outputs a pulse at a predetermined crank angle position for a specific cylinder of the engine 1 (this pulse will be hereinafter referred to as "CYL pulse"). The TDC sensor outputs a TDC pulse at a crank angle position before a top dead center (TDC) of a predetermined crank angle starting at an intake stroke in each cylinder (at every 180 deg crank angle in the case of a four-cylinder engine). The CRK sensor generates one pulse with a constant crank angle period (e.g., a period of 30 deg) shorter than the period of generation of the TDC pulse (this pulse will be hereinafter referred to as "CRK pulse"). The CYL pulse, the TDC pulse, and the CRK signal pulse are supplied to the ECU 5. These pulses are used to control the various timings, such as fuel injection timing and ignition timing, and for detection of an engine rotational speed NE.

An ignition plug 11 provided in each cylinder of the engine 1 is connected to the ECU 5. A signal for driving the ignition plug 11, that is, an ignition signal is supplied from the ECU 5 to the ignition plug 11.

An exhaust pipe 12 of the engine 1 is provided with a three-way catalyst 15 for reducing HC, CO, and NOx. A proportional type air-fuel ratio sensor (which will be hereinafter referred to as "LAF sensor") 14 is mounted on the exhaust pipe 12 at a position upstream of the three-way catalyst 15. The LAF sensor 14 outputs an electrical signal substantially proportional to the oxygen concentration (air-fuel ratio) in the exhaust gases, and supplies the electrical signal to the ECU 5.

An exhaust gas recirculation passage 21 is connected between a portion of the intake pipe 2 downstream of the throttle valve 3 and a portion of the exhaust pipe 12 upstream of the three way catalyst 15. The exhaust gas recirculation passage 21 is provided with an exhaust gas recirculation valve (which will be hereinafter referred to as "EGR valve") 22 for controlling an exhaust gas recirculation amount. The EGR valve 22 is an electromagnetic valve having a solenoid, and its valve opening degree is controlled by the ECU 5. The EGR valve 22 is provided with a lift sensor 23 for detecting the valve opening degree (valve lift) LACT of the EGR valve 22, and a detection signal from the lift sensor 23 is supplied to the ECU 5. The exhaust gas recirculation passage 21 and the EGR valve 22 constitute an exhaust gas recirculation mechanism.

The engine 1 may have a valve timing switching mechanism 30 capable of switching the valve timing of intake valves and exhaust valves between a high-speed valve timing suitable for a high-speed operating region of the engine 1 and a low-speed valve timing suitable for a low-speed operating region of the engine 1. Switching the valve timing also includes switching a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

An atmospheric pressure sensor 31 for detecting an atmospheric pressure PA is connected to the ECU 5. A detection signal from the atmospheric pressure sensor 31 is supplied to the ECU 5.

The ECU 5 includes an input circuit, a central processing unit (hereinafter, referred to as "CPU"), a memory circuit, and an output circuit. The input circuit has various functions, for example, a function of shaping waveforms of input signals from the various sensors, a function of correcting voltage levels of input signals to predetermined levels, and a function of converting analog signal values into digital signal values. The memory circuit previously stores various operating programs to be executed by the CPU and also stores results of computation or the like executed by the CPU. The output circuit supplies drive signals to the fuel injection valves 6, the ignition plugs 11, the EGR valve 22, and the like.

The CPU of the ECU 5 determines various engine operating conditions according to the detection signals of the various sensors mentioned above, and computes a fuel injection period TOUT of each fuel injection valve 6 to be opened in synchronism with the TDC signal pulse, in accordance with Eq. (1) according to the above determined engine operating conditions.

$$TOUT = TIM \times KCMD \times KLAF \times KEGR \times K1 + K2 \qquad (1)$$

TIM is a basic fuel amount and represents a basic fuel injection period for each fuel injection valve 6. The basic fuel amount TIM is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA.

KCMD is a target air-fuel ratio coefficient, which is set according to engine operating parameters such as the engine rotational speed NE, the throttle opening THA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio. Therefore, KCMD is also referred to as a target equivalent ratio.

KLAF is an air-fuel ratio correction coefficient calculated by the PID (Proportional, Integral, and Differential) control so that a detected equivalent ratio KACT calculated from a value detected by the LAF sensor 14 becomes equal to the target equivalent ratio KCMD when the execution conditions of the air-fuel ratio feedback control are satisfied.

KEGR is an EGR correction coefficient which is set to 1.0 (noncorrection value) when the exhaust gas recirculation is not carried out (when the EGR valve 22 is closed) or set to a value less than 1.0 when the exhaust gas recirculation is carried out (when the EGR valve 22 is opened) to decrease a fuel injection amount according to a decrease in the intake air amount.

K1 and K2 are another correction coefficient and a correction variable computed according to various engine parameter signals, respectively. Correction coefficient K1 and correction variable K2 may be selected to optimize various characteristics such as fuel consumption characteristics and engine acceleration characteristics according to engine operating conditions.

The CPU of the ECU 5 further calculates an ignition timing IGLOG from Eq. (2) shown below.

$$IG = IGMAP + IGEGR \qquad (2)$$

IGMAP is a basic value of ignition timing, i.e., an ignition timing indicative of an advance angle value with respect to a top dead center, obtained by retrieving an IG map set according to the engine rotational speed NE and the absolute intake pressure PBA. IGEGR is an EGR correction term set according to the engine rotational speed NE, the intake absolute pressure PBA, and the EGR correction coefficient KEGR. The EGR correction coefficient IFEGR is calculated as an advance angle correction amount.

The CPU of the ECU 5 further calculates a lift amount command value LCMD for the EGR valve 22 in accordance with the engine rotational speed NE and the intake absolute pressure PBA.

The ECU 5 outputs a drive signal for opening each fuel injection valve 6 corresponding to the fuel injection time TOUT obtained as described above, an ignition signal for driving each ignition plug 11 corresponding to the ignition timing IG obtained as described above, and a drive signal for the EGR valve 22 corresponding to the lift amount command value LCMD obtained as described above.

Figure 2:
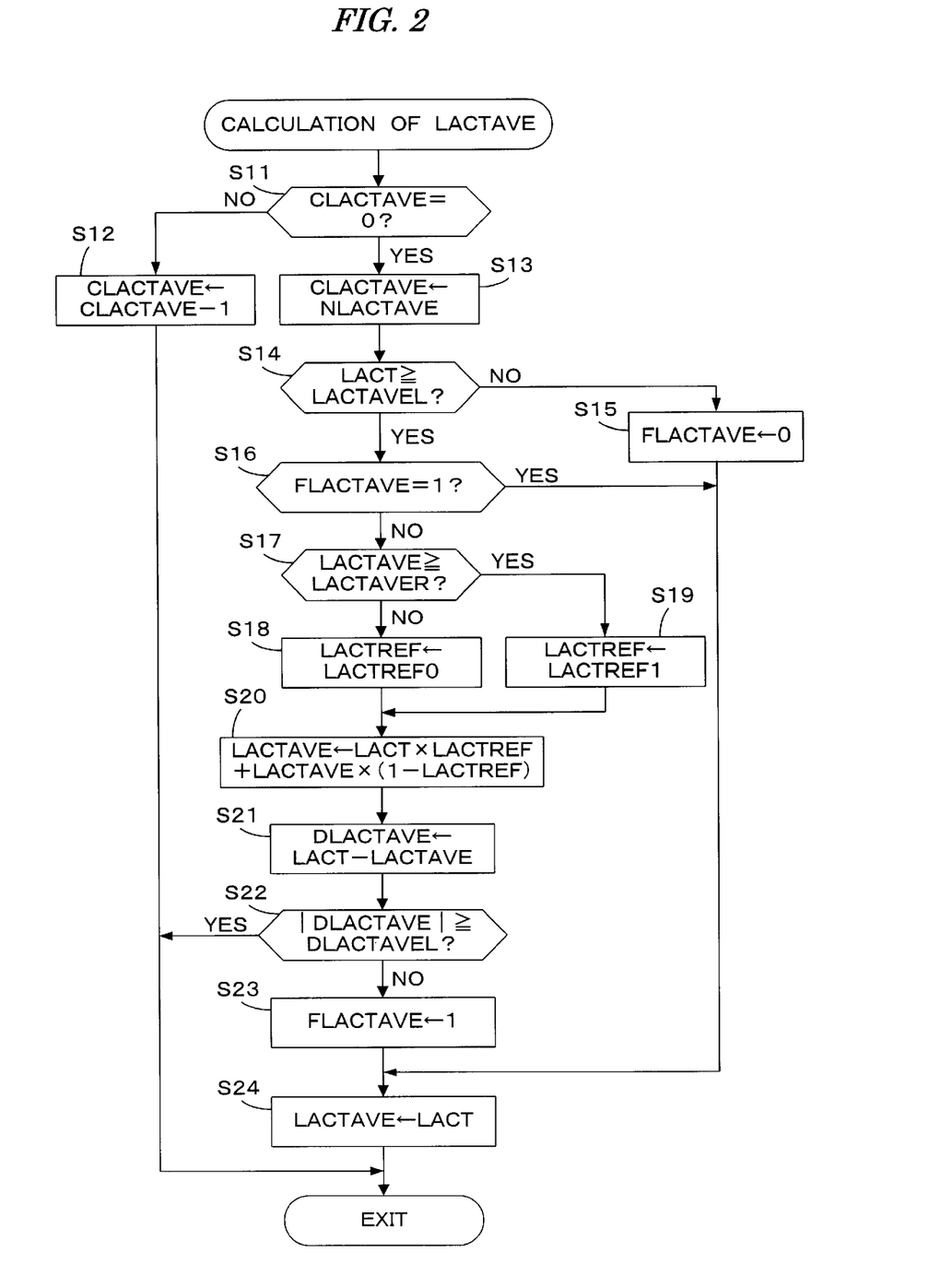
FIG. 2 is a flow chart showing a process for calculating an average lift amount (LACTAVE)

FIG. 2 is a flow chart showing a process for averaging an actual lift amount LACT of the EGR valve 22, detected by the lift sensor 23, and calculating an average lift amount LACTAVE. This process is executed at predetermined intervals (for example, 10 msec) by the CPU of the ECU 5. The average lift amount LACTAVE is used in the process shown in FIG. 6.

In step S11, it is determined whether or not a value of a counter CLACTAVE is "0". If CLACTAVE is greater than "0", the value of the counter CLACTAVE is decremented by "1" (step S12). Thereafter, this process ends. If CLACTAVE is equal to "0", a predetermined number NLACTAVE (for example, 4) is set to the counter CLACTAVE. According to steps S11 to S13, the following steps S14 to S24 are executed once per the predetermined number NLACTAVE of times.

In step S14, it is determined whether or not the actual lift amount LACT is equal to or more than a valve opening determination lift amount LACTAVEL. The valve opening determination lift amount LACTAVEL is set to a very small value close to "0". Therefore, in step S14, it is substantially determined whether or not the EGR valve 22 has opened. If the answer to step S14 is negative (NO), an average calculation flag FLACTAVE is set to "0" (step S15) and the average lift amount LACTAVE is set to the actual lift amount LACT (step S24). Thereafter, this process ends.

If LACT is greater than or equal to LACTAVEL in step S14, which indicates that the EGR valve 22 is in the valve open state, it is determined whether or not the average calculation flag FLACTAVE is "1" (step S16). Since FLACTAVE is equal to "0" initially, the process proceeds to step S17, in which it is determined whether or not the average lift amount LACTAVE is equal to or more than a predetermined lift amount LACTAVER. When the EGR valve 22 opens from the valve closed state, the average lift amount LACTAVE is initially less than the predetermined lift amount LACTAVER (LACTAVE<LACTAVER). Accordingly, an averaging coefficient LACTREF is set to a first averaging coefficient value LACTREF0 (step S18). When the average lift amount LACTAVE reaches the predetermined lift amount LACTAVER, the process proceeds from step S17 to step S19, in which the averaging coefficient LACTREF is set to a second averaging coefficient value LACTREF1 which is greater than the first averaging coefficient value LACTREF0.

In step S20, the actual lift amount LACT and the averaging coefficient LACTREF are applied to the following equation (3) to calculate the average lift amount LACTAVE.

$$LACTAVE = LACT \times LACTREF + LACTAVE \times (1-LACTREF) \quad (3)$$

where LACTAVE on the right side is a preceding calculated value.

In step S21, a lift amount difference DLACTAVE (LACT−LACTAVE) between the actual lift amount LACT and the average lift amount LACTAVE is calculated, and it is determined whether or not the absolute value of the lift amount difference DLACTAVE is equal to or more than a predetermined difference DLACTAVEL (step S22). When the EGR valve 22 opens from the valve closed state, the absolute value of the lift amount difference DLACTAVE is initially equal to or more than the predetermined difference DLACTAVEL ($|DLACTAVE| \geq DLACTAVEL$). Accordingly, this process immediately ends.

When the absolute value of the lift amount difference DLACTAVE decreases to a value which is less than the predetermined difference DLACTAVEL, the process proceeds from step S22 to step S23, in which the average calculation flag FLACTAVE is set to "1". Thereafter, the process proceeds to step S24. After the average calculation flag FLACTAVE is set to "1", the process immediately proceeds from step S16 to step S24.

Figure 3A:
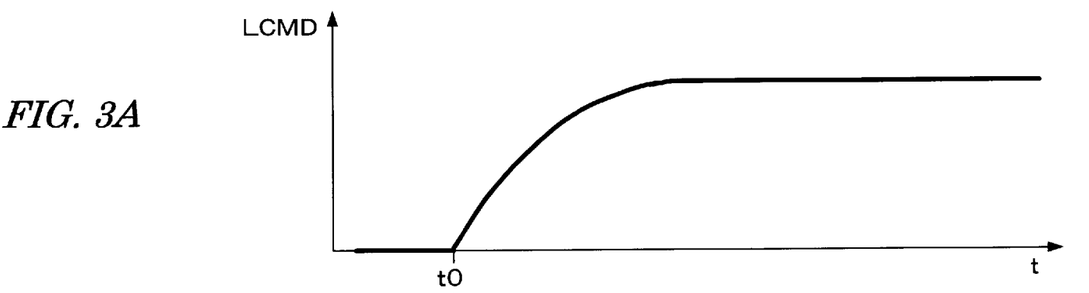
FIGS. 3A to 3C are time charts illustrating the process shown in FIG. 2.
Figure 3B:
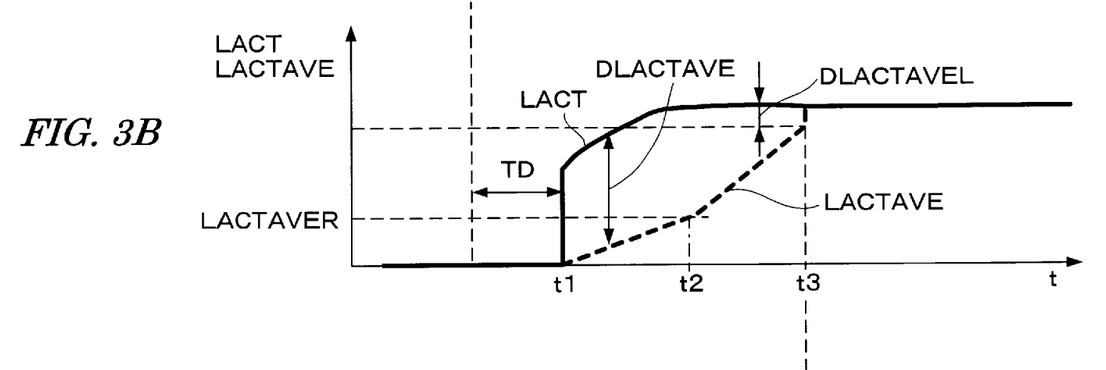
Figure 3C:
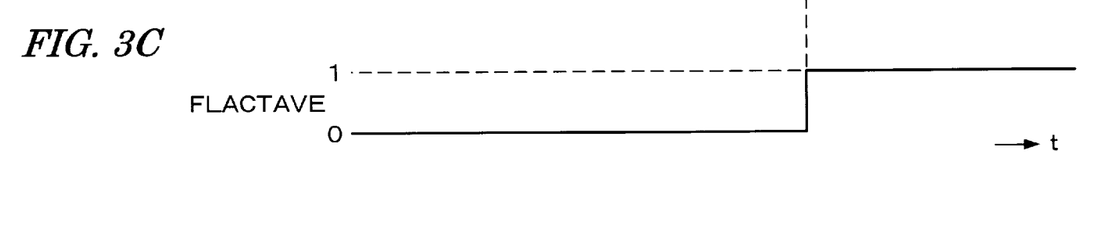

FIG. 3 is a time chart for illustrating the process shown in FIG. 2. The lift amount command value LCMD begins to increase from time t0. After a dead time period TD has elapsed from time t0, the actual lift amount LACT stepwise increases at time t1. Thereafter, the actual lift amount LACT gradually increases. The average lift amount LACTAVE increases from time t1 with a change rate determined by the first averaging coefficient value LACTREF0. When the average lift amount LACTAVE reaches the predetermined lift amount LACTAVER at time t2, the averaging coefficient LACTREF is changed to the second averaging coefficient value LACTREF1. Thereafter, the average lift amount LACTAVE increases with a change rate which is greater than the change rate before time t2. When the absolute value of the lift amount difference DLACTAVE becomes less than the predetermined difference DLACTAVEL at time t3, the average calculation flag FLACTAVE is set to "1" and the average lift amount LACTAVE is set to the actual lift amount LACT.

Accordingly, when the EGR valve 22 opens from the valve closed state, the average lift amount LACTAVE gradually increases with the change rate which is less than the change rate of the actual lift amount LACT. When the absolute value of the lift amount difference DLACTAVE between the actual lift amount LACT and the average lift amount LACTAVE becomes less than the predetermined difference DLACTAVEL, the average lift amount LACTAVE becomes equal to the actual lift amount LACT. The change rate of the average lift amount LACTAVE is initially set to a value corresponding to the first averaging coefficient value LACTREF0, and after time t2, the change rate of the average lift amount LACTAVE is set to a value corresponding to the second averaging coefficient value LACTREF1. As a result, a rapid change of the average lift amount LACTAVE can be prevented at the beginning of opening of the EGR valve 22. After the EGR valve 22 has opened to some extent, the change rate of the average lift amount LACTAVE becomes large (the difference between the average lift amount LACTAVE and the actual lift amount LACT rapidly decreases), to thereby obtain the average lift amount LACTAVE that is suitable for the fuel amount control and the ignition timing control described below.

A method of calculating the EGR correction coefficient KEGR used in the above-described equation (1) will be described below with reference to FIGS. 4 to 7.

Figure 4:
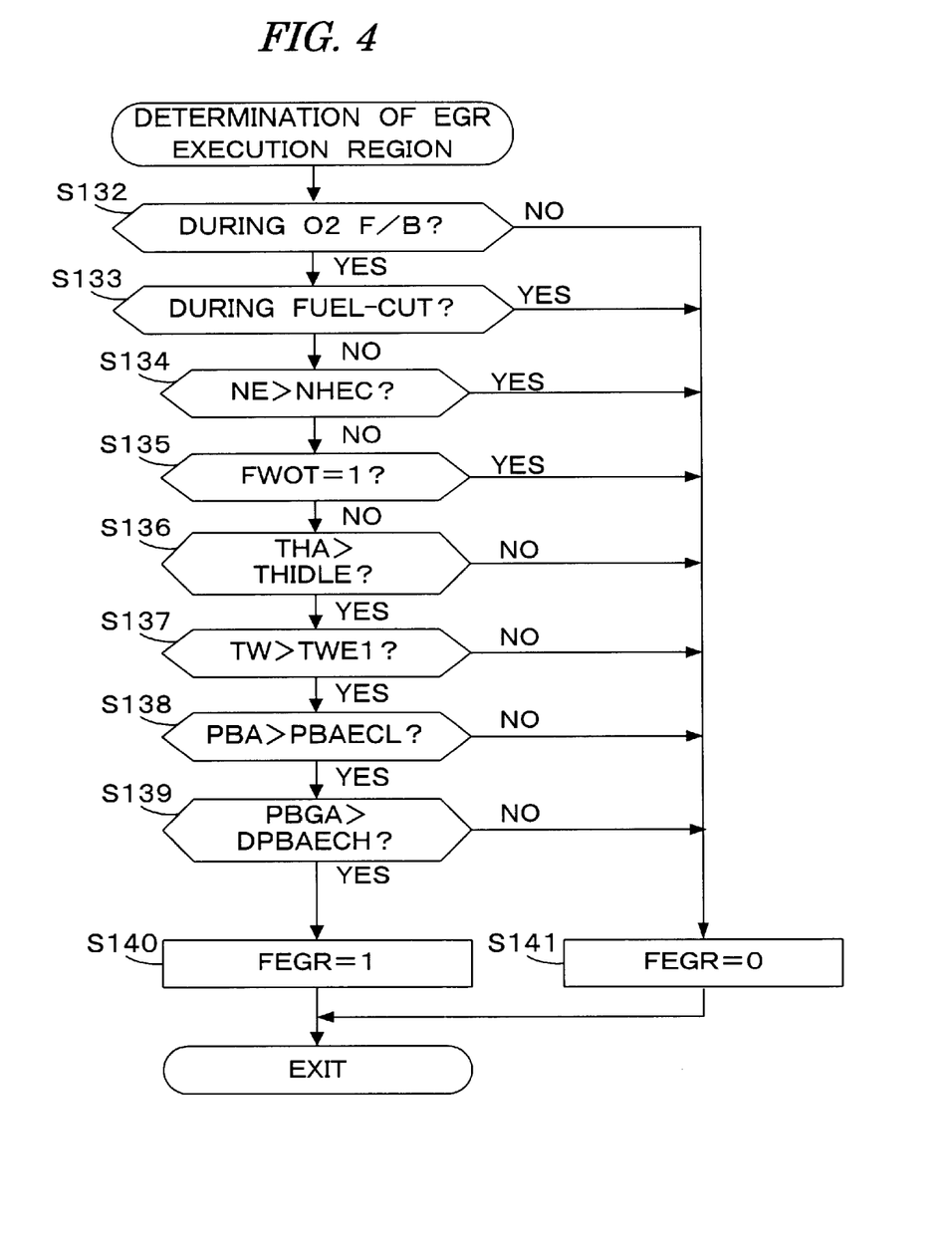
FIG. 4 is a flow chart showing a process for determining an engine operating region in which the exhaust gas recirculation is to be executed.

FIG. 4 is a flow chart showing an EGR execution region determination process for determining an engine operating region in which the exhaust gas recirculation is to be executed. The process is executed in synchronism with generation of the TDC pulse, by the CPU of the ECU 5.

Steps S132 to S139 are executed to determine whether or not the engine 1 is in a predetermined operating condition where the exhaust gas recirculation execution condition is satisfied. In step S132, it is determined whether or not the engine 1 is under the air-fuel ratio feedback control according to the output from the LAF sensor 14. If the answer to step S132 is affirmative (YES), it is determined whether or not the engine 1 is in a fuel-cut operation for cutting off the supply of fuel to the engine 1 (step S133). If the answer to step S133 is negative (NO), it is determined whether or not the engine rotational speed NE is higher than a predetermined rotational speed NHEC (e.g., 4500 rpm) (step S134). If the answer to step S134 is negative (NO), it is determined whether or not a wide-open throttle operation flag FWOT is set to "1", indicating that the throttle valve 3 is in a fully opened condition (step S135). If the answer to step S135 is negative (NO), it is determined whether or not the throttle valve opening THA is greater than a predetermined valve opening THIDLE, which indicates that the engine 1 is not operating in the idling condition (step S136). If the answer to step S136 is affirmative (YES), it is determined whether or not the engine coolant temperature TW is higher than a predetermined temperature TWEL (e.g., 40 degrees Centigrade) as at cold starting of the engine 1 (step S137). If the answer to step S137 is affirmative (YES), it is determined whether or not the absolute intake pressure PBA is higher than a predetermined pressure PBAECL, which indicates that the engine 1 is not in a low-load condition (step S138). If the answer to step S138 is affirmative (YES), it is determined whether or not the pressure difference PBGA (=PA−PBA) between the absolute intake pressure PBA and the atmospheric pressure PA is higher than a predetermined pressure DPBAECH, which indicates that the engine 1 is not in a high-load condition (step S139). If the answer to step S139 is affirmative (YES), it is determined that the exhaust gas recirculation execution condition is satisfied, and the EGR flag FEGR is set to "1" (step S140).

On the other hand, if the answer to one of steps S132, and S136 through S139 is negative (NO), or the answer to one of steps S133, S134, and S135 is affirmative (YES), the EGR flag FEGR is set to "0" (step S141) to inhibit the exhaust gas recirculation, so as to prevent a reduction in the operating performance of the engine 1 due to execution of the exhaust gas recirculation.

Figure 5:
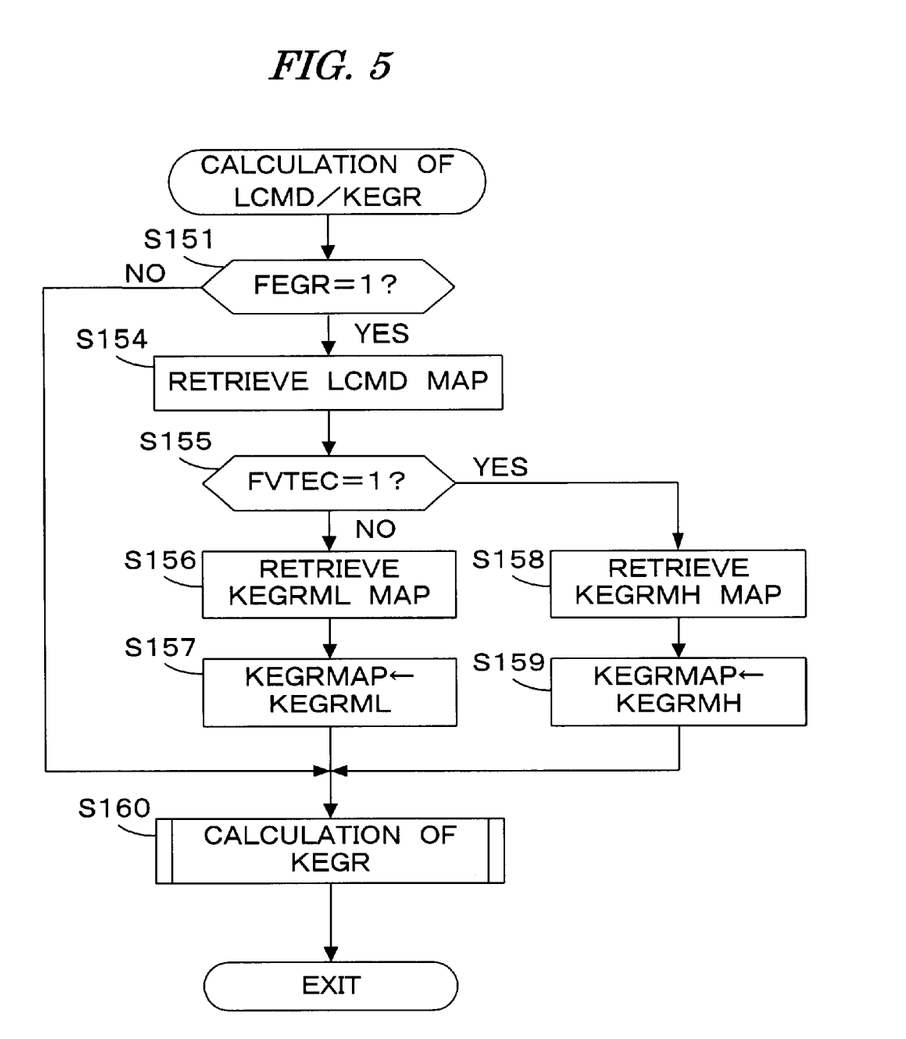
FIG. 5 is a flow chart showing a process for calculating a lift amount command value (LCMD) and an EGR correction coefficient (KEGR)

FIG. 5 is a flow chart showing an LCMD/KEGR calculation process for calculating the lift amount command value LCMD and the EGR correction coefficient KEGR. This process is executed in synchronism with generation of the TDC pulse, by the CPU of the ECU 5.

In step S151, it is determined whether or not the EGR flag FEGR is "1". If FEGR is equal to "0", the process immediately proceeds to step S160. When FEGR is "1", an LCMD map is retrieved according to the engine rotational speed NE and the absolute intake pressure PBA to calculate a lift command value LCMD for the EGR valve 22 (step S154). Then, it is determined whether or not a valve timing flag FVTEC is "1", indicating that the high-speed valve timing is selected (step S155). If FVTEC is "1", a KEGRMH map is retrieved according to the engine rotational speed NE and the absolute intake pressure PBA to calculate an EGR correction coefficient KEGRMH for the high-speed valve timing (step S158), and an EGR correction coefficient map value KEGRMAP is set to the EGR correction coefficient KEGRMH for high-speed valve timing (step S159). Then, the process proceeds to step S160.

If FVTEC is "0" in step S155, a KEGRML map is retrieved according to the engine rotational speed NE and the absolute intake pressure PBA to calculate an EGR correction coefficient KEGRML for low-speed valve timing (step S156), and the map value KEGRMAP is set to the EGR correction coefficient KEGRML for low-speed valve timing (step S157). Then, the process proceeds to step S160.

Figure 6:
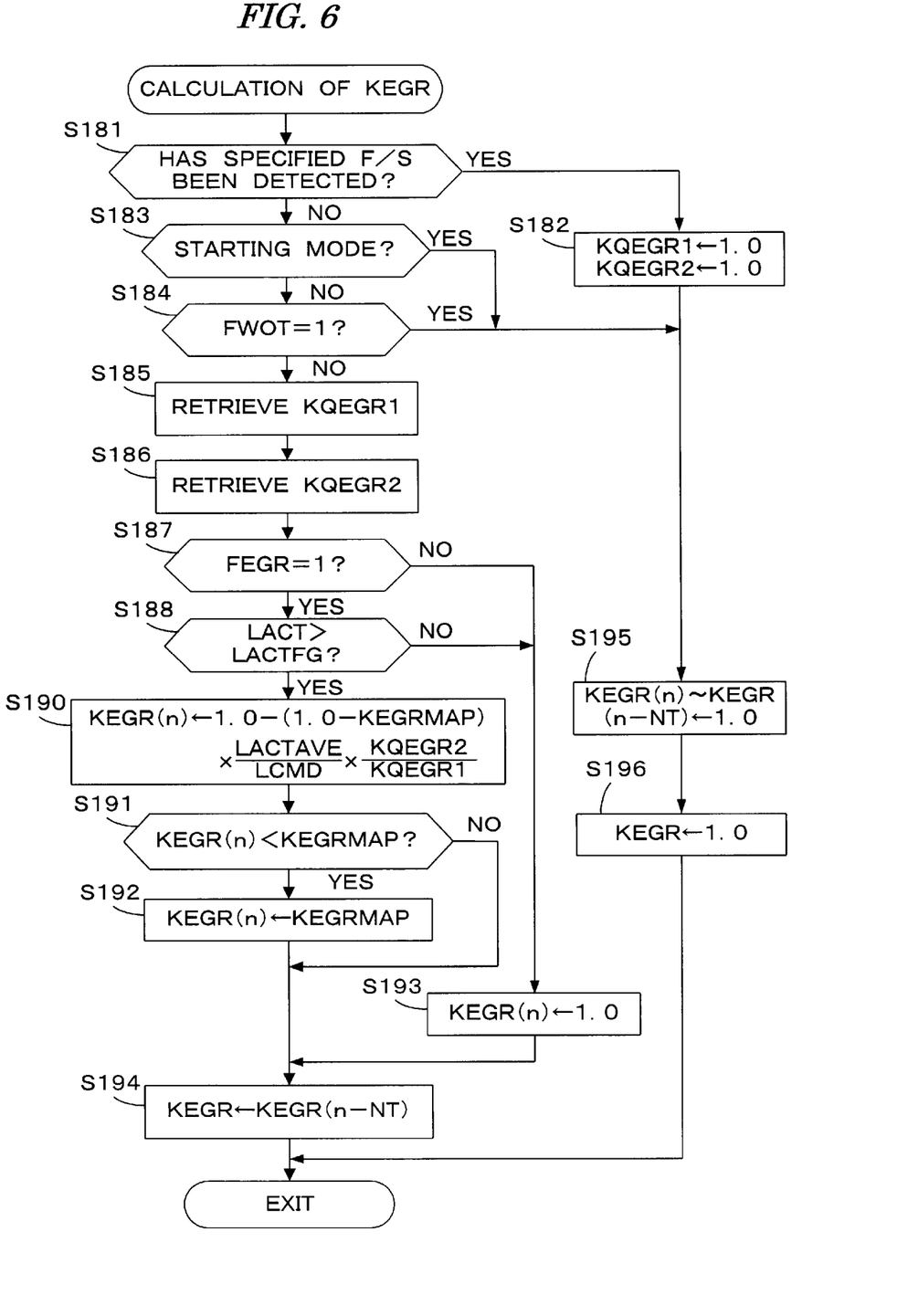
FIG. 6 is a flow chart showing a process for calculating the EGR correction coefficient (KEGR)

In step S160, KEGR calculation process (an example of which is shown in FIG. 6) is executed, and the process ends.

FIG. 6 is a flow chart showing the KEGR calculation process to be executed in step S160 shown in FIG. 5. In this process, the EGR correction coefficient KEGR to be actually applied Eq. (1) is calculated according to the map value KEGRMAP of the EGR correction coefficient.

In step S181, it is determined whether or not a preliminarily specified abnormality has been detected. If the abnormality has been detected, a first coefficient value KQEGR1 and a second coefficient value KQEGR2 to be hereinafter described are both set to "1.0" (step S182). Further, all coefficient values KEGR(n) to KEGR(n−NT) stored in the memory are set to "1.0" (step S195), and the EGR correction coefficient KEGR to be applied to Eq. (1) mentioned above is set to "1.0" (step S196). Thereafter, this process ends.

In this embodiment, a coefficient value calculated according to an engine operating condition at the execution cycle NT times before (a coefficient value calculated at the time NT times generations of the TDC signal pulse before) is used as the EGR correction coefficient KEGR to be applied to Eq. (1), since there is a time lag due to movement of recirculated gases from the EGR valve 22 to the combustion chamber of the engine 1. Accordingly, the present value KEGR(n) calculated every time this process is executed is sequentially stored into the memory. The process of step S195 is for setting all of the (NT+1) coefficient values thus stored to "1.0".

If the answer to step S181 is negative (NO), it is determined whether or not the engine 1 is in the starting mode (step S183). If the engine 1 is not in the starting mode, it is then determined whether or not the wide-open throttle operation flag FWOT is "1" (step S184). If the engine 1 is in the starting mode or if the engine 1 is in the wide-open throttle mode, the process proceeds to step S195. If the starting of the engine 1 has been finished and the engine 1 is not operating with a wide-open throttle, the process proceeds to step S185.

Figure 7:
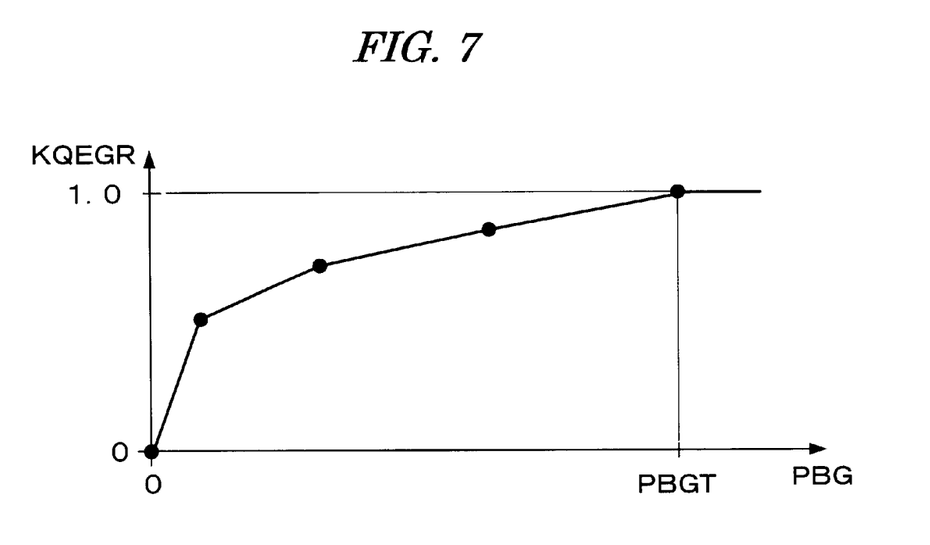
FIG. 7 shows a table used in the process shown in FIG. 6.

In step S185, a KQEGR table (an example of which is shown in FIG. 7) is retrieved according to a pressure difference PBG1 (=PA0−PBA) between a reference atmospheric pressure PA0 (=101.3 kPa (760 mmHg)) and the absolute intake pressure PBA to calculate a first coefficient value KQEGR1. The KQEGR table is set so that the coefficient value KQEGR increases as the pressure difference PBG increases up to a predetermined pressure PBGT. The predetermined pressure PBGT may be set to 28 kPa (210 mmHg), for example.

In step S186, the KQEGR table shown in FIG. 7 is retrieved according to a pressure difference PBG2 between a current atmospheric pressure PA and the absolute intake pressure PBA to calculate a second coefficient value KQEGR2.

Next, it is determined whether or not the EGR flag FEGR is "1" (step S187). If FEGR is "0", which indicates that the exhaust gas recirculation is not carried out, the present value KEGR(n) of the EGR correction coefficient is set to "1.0" (step S193) and the process then proceeds to step S194. On the other hand, if FEGR is "1", which indicates that the exhaust gas recirculation is being carried out, it is determined whether or not the actual valve lift LACT of the EGR valve 22 is greater than a predetermined valve lift LACTFG (step S188). If LACT is less than or equal to LACTFG, which indicates that the actual valve lift LACT is almost zero, the process proceeds to step S193.

If LACT is greater than LACTFG in step S188, the map value KEGRMAP, the average lift amount LACTAVE, the valve lift command value LCMD, and the first and second coefficient values KQEGR1 and KQEGR2 are applied to Eq. (4) shown below to calculate the present value KEGR(n) of the EGR correction coefficient (step S190).

$$KEGR(n)=1.0-(1.0-KEGRMAP) \times (LACTAVE/LCMD) \times (KQEGR2/KQEGR1) \quad (4)$$

where LACTAVE/LCMD is a correction term for correcting a delay of a change in the average lift amount LACTAVE from a change in the valve lift command value LCMD in a transient condition where the valve lift of the EGR valve 22 is changing, and KQEGR2/KQEGR1 is a correction term for correcting an influence of a change in the atmospheric pressure PA. By applying the average lift amount LACTAVE calculated in the process of FIG. 2 to Eq. (4), it is possible to prevent the EGR correction coefficient KEGR from rapidly decreasing when the actual lift amount LACT rapidly increases from "0", and hence to keep a desirable exhaust characteristic.

In step S191, it is determined whether or not the present value KEGR(n) calculated in step S190 is less than the map value KEGRMAP. If KEGR(n) is less than KEGRMAP, the present value KEGR(n) is replaced by the map value KEGRMAP (step S192), and the process proceeds to step S194. If KEGR(n) is greater than or equal to KEGRMAP, the process proceeds directly to step S194.

In step S194, the EGR correction coefficient KEGR to be applied to Eq. (1) is set to the NT times-before coefficient value KEGR(n−NT). Then, this process ends.

By calculating the EGR correction coefficient KEGR as described above, the EGR correction coefficient KEGR indicating an actual ratio of an intake air amount to an intake gas amount (intake air amount+exhaust gas recirculation amount) can be obtained. Applying the EGR correction coefficient KEGR to Eq. (1) makes it possible to perform the accurate air-fuel ratio control and hence to obtain a desirable exhaust characteristic.

A method of calculating the EGR correction term IGEGR to be applied to Eq. (2) for calculating the ignition timing IG will be described below with reference to FIGS. 8 and 9.

Figure 8:
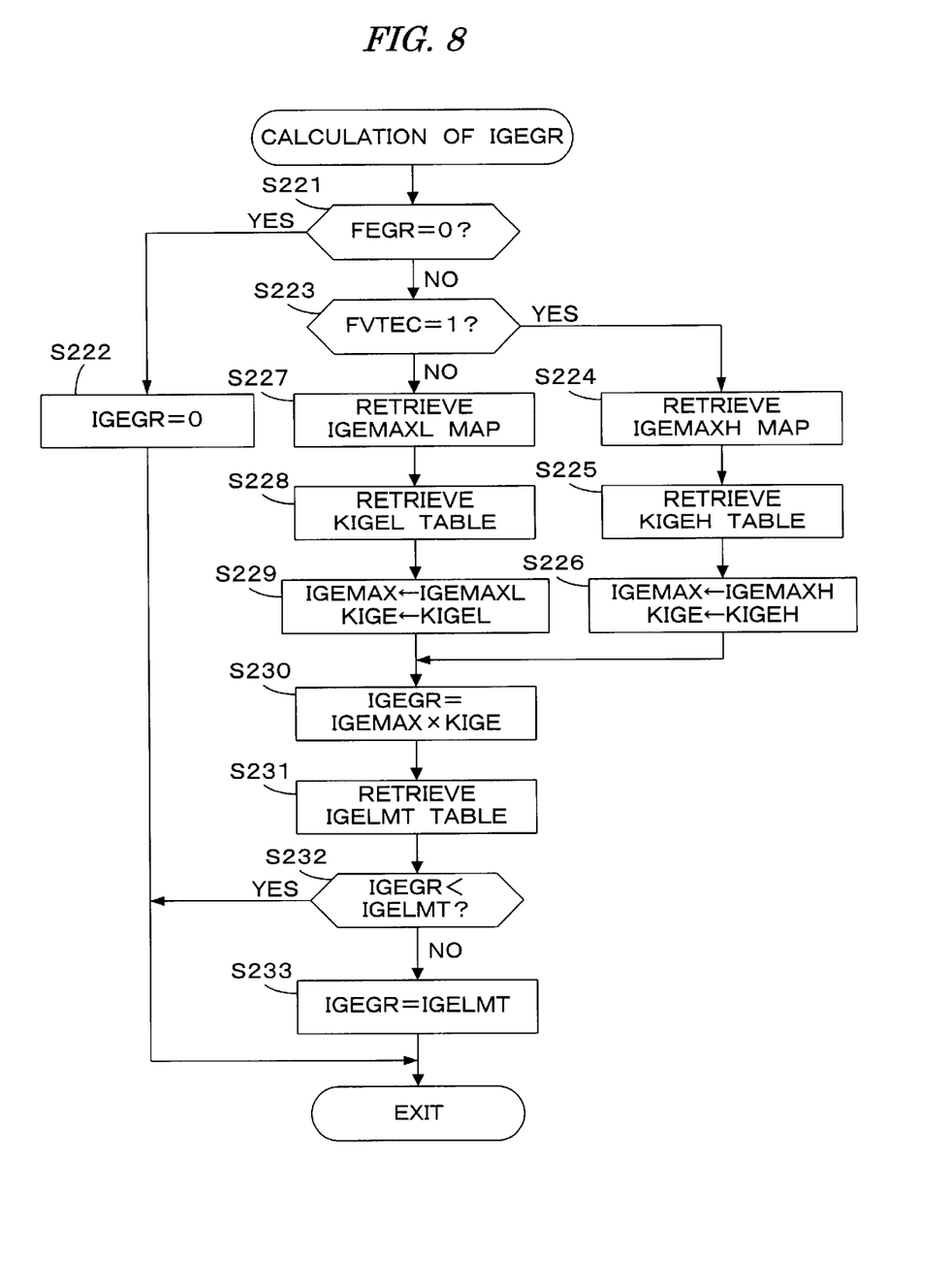
FIG. 8 is a flow chart showing a process for calculating an EGR correction term (IGEGR)

FIG. 8 is a flow chart showing a process for calculating the EGR correction term IGEGR. This process is performed in synchronism with generation of the TDC pulse by the CPU of the ECU 5.

In step S221, it is determined whether or not the EGR flag FEGR is "0". If FEGR is equal to "0", which indicates that the exhaust gas recirculation is not performed, the EGR correction term IGEGR is set to "0" (step S222). Thereafter, this process ends. When FEGR is equal to "1", which indicates that the exhaust gas recirculation is being performed, it is determined whether or not the valve timing flag FVTEC is "1" (step S223).

Figure 9:
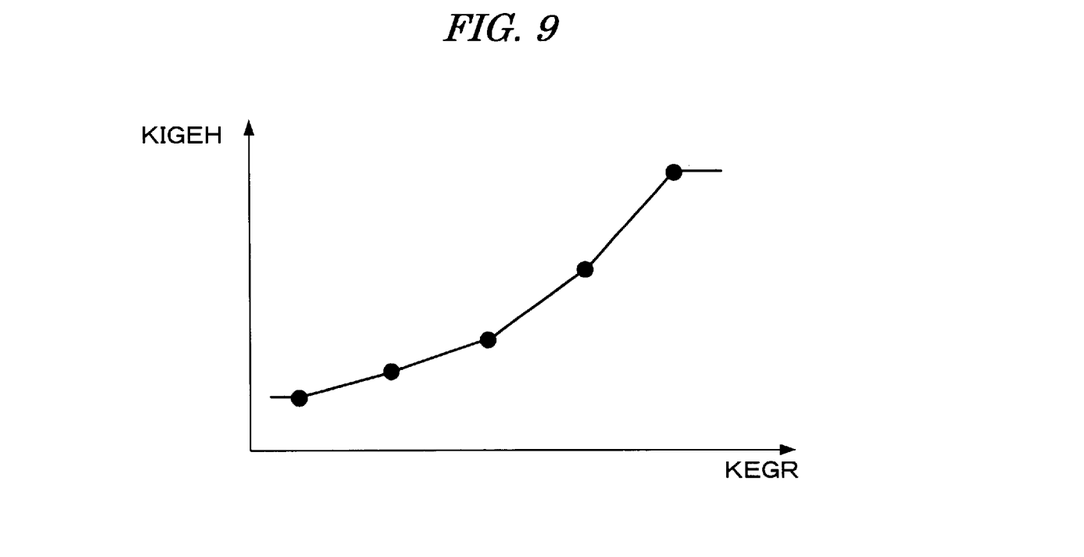
FIG. 9 shows a table used in the process shown in FIG. 8.

If FVTEC is equal to "1", which indicates that the high speed valve timing is selected, an IGEMAXH map (not shown) is retrieved according to the engine rotational speed NE and the intake absolute pressure PBA, to calculate a maximum advance angle value IGEMAXH for the high speed valve timing (step S224). Subsequently, a KIGEH table shown in FIG. 9 is retrieved according to the EGR correction coefficient KEGR calculated by the process shown in FIG. 6, to calculate an advance angle correction coefficient KIGEH for the high speed valve timing (step S225). The KIGEH table is set such that the advance angle correction coefficient KIGEH decreases with a decrease in the EGR correction coefficient KEGR (i.e., with an increase in the exhaust gas recirculation amount). In step S226, the maximum advance angle value IGEMAX and the advance angle correction coefficient KIGE are set respectively to the maximum advance angle value IGEMAXH and the advance angle correction coefficient KIGEH for the high speed valve timing calculated in steps S224 and S225. Thereafter, the process proceeds to step S230.

If FVTEC is equal to "0", which indicates that the low speed valve timing is selected, an IGEMAXL map (not shown) is retrieved according to the engine rotational speed NE and the intake absolute pressure PBA, to calculate a maximum advance angle value IGEMAXL for the low speed valve timing (step S227). Subsequently, a KIGEL table (not shown) is retrieved according to the EGR correction coefficient KEGR calculated by the process shown in FIG. 6, to calculate an advance angle correction coefficient KIGEL for the low speed valve timing (step S228). Like the KIGEH table, the KIGEL table is set such that the advance angle correction coefficient KIGEL decreases with a decrease in the EGR correction coefficient KEGR (i.e., with an increase in the exhaust gas recirculation amount). In step S229, the maximum advance angle value IGEMAX and the advance angle correction coefficient KIGE are set respectively to the maximum advance angle value IGEMAXL and the advance angle correction coefficient KIGEL for the low speed valve timing calculated in step S227 and 228. Thereafter, the process proceeds to step S230.

In step S230, the EGR correction term IGEGR is calculated from Eq. (5) shown below.

$$IGEGR=IGEMAX \times KIGE \quad (5)$$

An IGELMT table (not shown) is retrieved according to the engine rotational speed NE to calculate an upper limit value IGELMT (step S231). The IGELMT table is set such that the upper limit value IGELMT increases with an increase in the engine rotational speed NE. In step S232, it is determined whether or not the EGR correction term IGEGR calculated in step S230 is less than the upper limit value IGELMT. If IGEGR is less than IGELMT, the process immediately ends. On the other hand, if IGEGR is greater than or equal to IGELMT, the EGR correction term IGEGR is set to the upper limit value IGELMT (step S233). Thereafter, this process ends.

With the process shown in FIG. 8, the advance angle correction coefficient KIGE is calculated according to the EGR correction coefficient KEGR calculated by the process shown in FIG. 6, and the EGR correction term IGEGR is calculated by multiplying the maximum advance angle value IGEMAX by the advance angle correction coefficient KIGE. Since the EGR correction coefficient KEGR is calculated according to the average lift amount LACTAVE, the EGR correction term IGEGR for correcting the ignition timing IG is also set not according to the actual lift amount LACT but according to the average lift amount LACTAVE. As a result, it is possible to prevent a rapid change in the EGR correction term IGEGR when the EGR valve 22 rapidly opens from the valve closed state, and hence maintain driveability.

In this embodiment, the lift sensor 23 constitutes valve opening amount detecting means, and the ECU 5 constitutes fuel supply amount correcting means, average value calculating means, correction value calculating means, and ignition timing correcting means. Specifically, the process shown in FIG. 2 corresponds to the average value calculating means, and the processes shown in FIGS. 6 and 8 correspond to the correction value calculating means. The processes shown in FIGS. 2 and 6 and the process for calculating the fuel injection period TOUT by applying the EGR correction coefficient KEGR calculated by the process shown in FIG. 6 to Eq. (1), correspond to the fuel supply amount correcting means. The processes shown in FIGS. 2, 6 and 8 and the process for calculating the ignition timing IG by applying the EGR correction term IGEGR calculated by the process shown in FIG. 8 to Eq. (2) correspond to the ignition timing correcting means.

The present invention is not limited to the embodiment described above, and various modifications may be made without departing from the scope of the present invention. For example, in the above embodiment, the EGR correction coefficient KEGR is calculated using the average lift amount LACTAVE and the EGR correction term IGEGR of the ignition timing is calculated according to the EGR correction coefficient KEGR. Alternatively, the EGR correction term IGEGR may be directly calculated using the average lift amount LACTAVE.

The present invention may be embodied in other specific forms without departing from the spirit or essential characteristics thereof. The presently disclosed embodiment is therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having an exhaust gas recirculation passage for recirculating a portion of exhaust gases from said engine to an intake system and an exhaust gas recirculation control valve for controlling an amount of exhaust gases recirculated through said exhaust gas recirculation passage, said control system comprising:
    valve opening amount detecting means for detecting a valve opening amount of said exhaust gas recirculation control valve; and
    fuel supply amount correcting means for correcting a fuel amount to be supplied to said engine according to the valve opening amount of said exhaust gas recirculation control valve;
    said fuel supply amount correcting means including:
    average value calculating means for calculating an average valve opening value according the valve opening amount detected by said valve opening amount detecting means, a change rate of the average valve opening value being smaller than that of the valve opening amount detected by said valve opening amount detecting means; and
    correction value calculating means for calculating a correction value for correcting the fuel supply amount according to the average valve opening value;
    wherein said fuel supply amount correcting means corrects the fuel supply amount according to the calculated correction value from a time at which an opening of said exhaust gas recirculation control valve is detected by said valve opening amount detecting means.

2. A control system according to claim 1, wherein said average value calculating means sets the change rate of the average valve opening value such that the change rate of the average valve opening value becomes smaller as the average valve opening value becomes smaller.

3. A control system for an internal combustion engine having an exhaust gas recirculation passage for recirculating a portion of exhaust gases from said engine to an intake system and an exhaust gas recirculation control valve for controlling an amount of exhaust gases recirculated through said exhaust gas recirculation passage, said control system comprising:
    valve opening amount detecting means for detecting a valve opening amount of said exhaust gas recirculation control valve; and
    ignition timing correcting means for correcting an ignition timing of said engine according to the valve opening amount of said exhaust gas recirculation control valve;
    said ignition timing correcting means including:
    average value calculating means for calculating an average valve opening value according the valve opening amount detected by said valve opening amount detecting means, a change rate of the average valve opening value being smaller than that of the valve opening amount detected by said valve opening amount detecting means; and
    correction value calculating means for calculating a correction value for correcting the ignition timing according to the average valve opening value;
    wherein ignition timing correcting means corrects the ignition timing according to the calculated correction value from a time at which an opening of said exhaust gas recirculation control valve is detected by said valve opening amount detecting means.

4. A control system according to claim 3, wherein said average value calculating means sets the change rate of the average valve opening value such that the change rate of the average valve opening value becomes smaller as the average valve opening value becomes smaller.

5. A control method for an internal combustion engine having an exhaust gas recirculation passage for recirculating a portion of exhaust gases from said engine to an intake system and an exhaust gas recirculation control valve for controlling an amount of exhaust gases recirculated through said exhaust gas recirculation passage, said control method comprising the steps of:
    a) detecting a valve opening amount of said exhaust gas recirculation control valve;
    b) calculating an average valve opening value according to the detected valve opening amount, a change rate of the average valve opening value being smaller than that of the detected valve opening amount;
    c) calculating a correction value for correcting a fuel supply amount be supplied to said engine according to the average valve opening value; and
    d) correcting the fuel supply amount according to the calculated correction value from a time at which an opening of said exhaust gas recirculation control valve is detected.

6. A control method according to claim 5, wherein the change rate of the average valve opening value is set such that the change rate of the average valve opening value becomes smaller as the average valve opening value becomes smaller.

7. A control method for an internal combustion engine having an exhaust gas recirculation passage for recirculating a portion of exhaust gases from said engine to an intake system and an exhaust gas recirculation control valve for controlling an amount of exhaust gases recirculated through said exhaust gas recirculation passage, said control method comprising the steps of:
    a) detecting a valve opening amount of said exhaust gas recirculation control valve;

b) calculating an average valve opening value according to the detected valve opening amount, a change rate of the average valve opening value being smaller than that of the detected valve opening amount;

c) calculating a correction value for correcting an ignition timing of said engine according to the average valve opening value; and d) correcting the ignition timing according to the calculated correction value from a time at which an opening of said exhaust gas recirculation control valve is detected.

8. A control method according to claim 7, wherein the change rate of the average valve opening value is set such that the change rate of the average valve opening value becomes smaller as the average valve opening value becomes smaller.

9. A computer having a storage medium to carry out a control method for an internal combustion engine having an exhaust gas recirculation passage for recirculating a portion of exhaust gases from said engine to an intake system and an exhaust gas recirculation control valve for controlling an amount of exhaust gases recirculated through said exhaust gas recirculation passage, said control method comprising the steps of:

a) detecting a valve opening amount of said exhaust gas recirculation control valve;

b) calculating an average valve opening value according to the detected valve opening amount, a change rate of the average valve opening value being smaller than that of the detected valve opening amount;

c) calculating a correction value for correcting a fuel supply amount to be supplied to said engine according to the average valve opening value; and d) correcting the fuel supply amount according to the calculated correction value from a time at which an opening of said exhaust gas recirculation control valve is detected.

10. A computer according to claim 9, wherein the change rate of the average valve opening value is set such that the change rate of the average valve opening value becomes smaller as the average valve opening value becomes smaller.

11. A computer having a storage medium to carry out a control method for an internal combustion engine having an exhaust gas recirculation passage for recirculating a portion of exhaust gases from said engine to an intake system and an exhaust gas recirculation control valve for controlling an amount of exhaust gases recirculated through said exhaust gas recirculation passage, said control method comprising the steps of:

a) detecting a valve opening amount of said exhaust gas recirculation control valve;

b) calculating an average valve opening value according to the detected valve opening amount, a change rate of the average valve opening value being smaller than that of the detected valve opening amount;

c) calculating a correction value for correcting an ignition timing of said engine according to the average valve opening value; and d) correcting the ignition timing according to the calculated correction value from a time at which an opening of said exhaust gas recirculation control valve is detected.

12. A computer according to claim 11, wherein the change rate of the average valve opening value is set such that the change rate of the average valve opening value becomes smaller as the average valve opening value becomes smaller.

* * * * *